(No Model.)

A. P. MORROW.
PNEUMATIC TIRE.

No. 507,325. Patented Oct. 24, 1893.

Witnesses
Jas. S. Smith
Frank B. Marlow

Inventor
Alexander P. Morrow,
By Chas. F. Benjamin,
His Attorney

UNITED STATES PATENT OFFICE.

ALEXANDER P. MORROW, OF NEW BRIGHTON, ASSIGNOR OF ONE-HALF TO HARMON H. FULTON, OF BEAVER FALLS, PENNSYLVANIA.

PNEUMATIC TIRE.

SPECIFICATION forming part of Letters Patent No. 507,325, dated October 24, 1893.

Application filed July 20, 1893. Serial No. 481,045. (No model.)

*To all whom it may concern:*

Be it known that I, ALEXANDER P. MORROW, a citizen of the United States, residing at New Brighton, in the county of Beaver and State of Pennsylvania, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to pneumatic tires for vehicles and especially to those appertaining to velocipedes. Its object is to seat a pneumatic tire firmly within the rim of a wheel.

Figure 1:
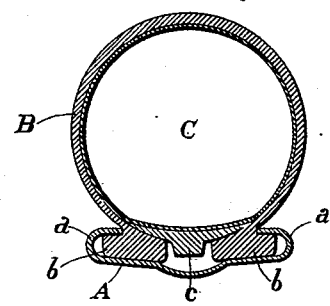
Figure 2:
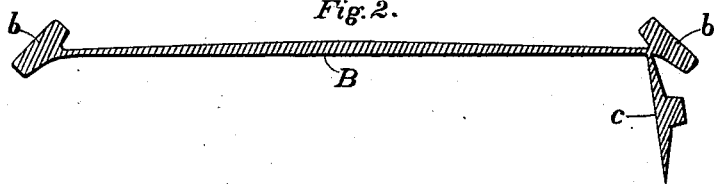

In the accompanying drawings, wherein like letters represent like parts, Figure 1 is a vertical cross section of a pneumatic tire showing the invention, and Fig. 2 a cross section of the tire detached from its wheel and spread out to show the construction and configuration of the tire, as made in one piece.

A represents the metallic rim of the wheel, its edges curved inward, substantially as shown at $a$ in the first figure of the drawings.

B is the tire, or outer casing, of any suitable, flexible material.

C is the air-tight, flexible tube, lining the tire.

The two side edges of the long strip of material that constitutes the tire B are formed into a pair of thick, rectangular shoulders, $b$, fitting into the curves of the wheel rim. Projected obliquely from and along the angle formed at the junction of the interior face of the web of the tire with either of its shoulders is a key, $c$, made in one piece with the tire and the tire shoulders, and the center part formed in wedge shape, as shown.

The air-tight tube being collapsed, the tire is fitted by its shoulders into the rim of the wheel. The key falls into position between the proximate surfaces of the two shoulders. Then the tube is inflated through its valve, and the shoulders thereby caused to press upon the key and so lock the tire in place. To displace the tire, the air is let out of the tube sufficiently to loosen the key and permit the shoulders to be removed from their seats in the rim.

I claim—

The combination in a wheel tire of the rim, having the inwardly curved edges; the flexible casing, having the shoulders formed along the two side edges thereof and further provided with the wedge shaped key formed integrally with said casing, and the air-tight flexible tube lining said casing; all substantially as and for the purposes described.

In testimony whereof I affix my signature in presence of two witnesses.

ALEXANDER P. MORROW.

Witnesses:
   C. C. ROBINGSON,
   E. C. CARTER.